(12) United States Patent
Zhan et al.

(10) Patent No.: US 10,371,157 B2
(45) Date of Patent: Aug. 6, 2019

(54) SMART FAN AND METHOD FOR CONTROLLING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Chen-Jing Zhan, Shenzhen (CN); Xian Qian, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/786,620

(22) Filed: Oct. 18, 2017

(65) Prior Publication Data

US 2019/0048882 A1    Feb. 14, 2019

(30) Foreign Application Priority Data

Aug. 14, 2017 (CN) .......................... 2017 1 0693763

(51) Int. Cl.
| | |
|---|---|
| *G01J 5/00* | (2006.01) |
| *F04D 25/06* | (2006.01) |
| *F04D 25/08* | (2006.01) |
| *F04D 27/00* | (2006.01) |
| *G05D 23/19* | (2006.01) |
| *G05D 23/20* | (2006.01) |
| *G05D 23/22* | (2006.01) |
| *G05D 23/24* | (2006.01) |
| *G05D 23/27* | (2006.01) |
| *H04L 12/28* | (2006.01) |

(52) U.S. Cl.
CPC ......... *F04D 25/08* (2013.01); *F04D 25/0666* (2013.01); *F04D 27/004* (2013.01); *G05D 23/1931* (2013.01); *G05D 23/20* (2013.01); *G05D 23/22* (2013.01); *G05D 23/24* (2013.01); *G05D 23/27* (2013.01); *H04L 12/2827* (2013.01); *H04L 12/2829* (2013.01); *G01J 5/0025* (2013.01)

(58) Field of Classification Search
CPC . F04D 25/08; F04D 25/0666; H04L 12/2829; G01J 5/0025
USPC ........................................................ 700/300
See application file for complete search history.

(56) References Cited

U.S. PATENT DOCUMENTS

| | | | |
|---|---|---|---|
| 6,415,984 B1 * | 7/2002 | Parker ................... | F04D 25/088 236/49.3 |
| 10,001,288 B1 * | 6/2018 | Yang ....................... | F24F 11/30 |

(Continued)

FOREIGN PATENT DOCUMENTS

CN            106351864 A        1/2017

*Primary Examiner* — Ziaul Karim
(74) *Attorney, Agent, or Firm* — ScienBiziP, P.C.

(57) ABSTRACT

A method for controlling rotational speed applied to a smart fan includes acquiring environmental temperature from a temperature sensor and radiation intensity of human body from an infrared sensor. A result of analysis is generated by determining whether the acquired environmental temperature is within a predetermined temperature range and the acquired radiation intensity is greater than a predetermined value. A working status of the smart fan can be changed according to the result when the smart fan is in automatic mode.

6 Claims, 2 Drawing Sheets

(56) References Cited

U.S. PATENT DOCUMENTS

| | | | |
|---|---|---|---|
| 2009/0074587 A1* | 3/2009 | Goswami | F04D 25/088 416/244 R |
| 2009/0208333 A1* | 8/2009 | Smith | F04D 25/088 416/5 |
| 2013/0262888 A1* | 10/2013 | Scott | G06F 1/3209 713/310 |
| 2015/0204561 A1* | 7/2015 | Sadwick | G05D 23/1905 236/1 C |
| 2016/0341603 A1* | 11/2016 | Kusukame | F24F 11/30 |

* cited by examiner

SMART FAN AND METHOD FOR CONTROLLING THE SAME

CROSS-REFERENCE TO RELATED APPLICATIONS

This application claims priority to Chinese Patent Application No. 201710693763.2 filed on Aug. 14, 2017, the contents of which are incorporated by reference herein.

FIELD

The subject matter herein generally relates to control technology, and particularly to a smart fan and a method for controlling rotational speed of the smart fan.

BACKGROUND

A user can feel cool when a fan is working with a high rotational speed in summer. However, the fan cannot adjust rotational speed automatically according to environmental temperature.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
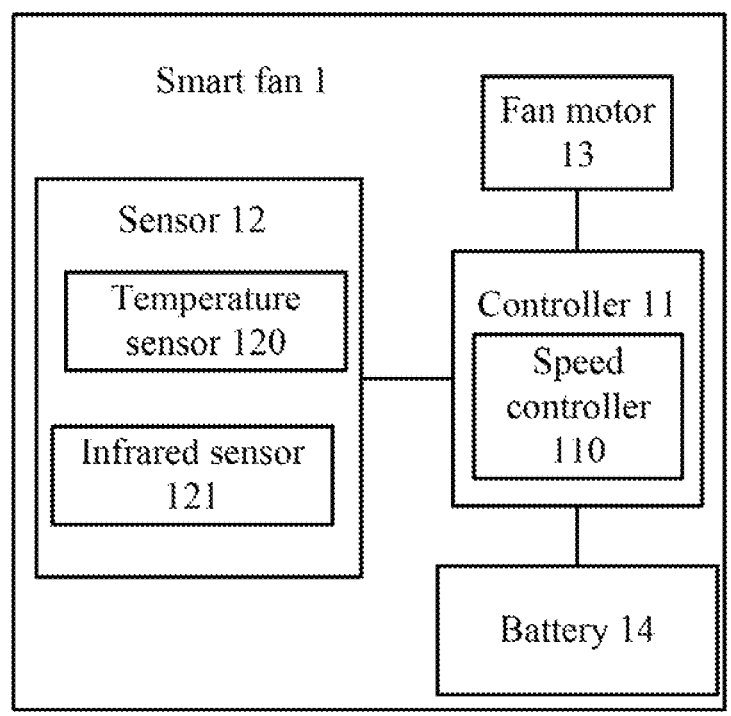
FIG. 1 is a schematic diagram of one exemplary embodiment of a smart fan.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives. The term "comprising" means "including, but not necessarily limited to"; it specifically indicates open-ended inclusion or membership in a so-described combination, group, series and the like.

FIG. 1 is a block diagram of one exemplary embodiment of smart fan 1. Depending on the embodiment, the smart fan 1 can include, but is not limited to, a controller 11, at least one sensor 12, a fan motor 13, and a battery 14. The controller 11 is electronically connected to the at least one sensor 12, the motor fan 13 and the battery 14. FIG. 1 illustrates only one example of the smart fan 1, other examples c can include more or fewer components than illustrated, or have a different configuration of the various components in other embodiments.

In at least one exemplary embodiment, the at least one sensor 12 include, but is not limited to, a temperature sensor 120 and an infrared sensor 121. The temperature sensor 120 can detect environmental temperature. The infrared sensor 121 can collect radiation intensity of human body. When the collected radiation intensity is weak, the collected radiation density becomes smaller. The wavelength between 9 um~10 um of the infrared rays which radiate from the human body is strongest. The collected radiation intensity of the wavelengths between 9 um~10 um of the infrared rays are between 10 W~100 W, and the collected radiation intensity are inversely proportional to a distance from the infrared sensor 121 to the human body. Thus, the collected radiation density is also inversely proportional to the distance too.

In at least one exemplary embodiment, the fan motor 13 can drive the smart fan 1 to work. The battery 14 can supply electrical energy for the smart fan 1. The controller 11 includes, but is not limited to, a speed controller 110. The speed controller 110 can control a rotational speed of the smart fan 1. The controller 11 can control the speed controller 110 to adjust the rotational speed of the smart fan 1 according to information collected by the at least one sensor 12. Thus, the smart fan 1 will work with a predetermined temperature range.

In at least one exemplary embodiment, a work mode of the smart fan 1 includes a sleep mode and a manual mode. In the sleep mode, the smart fan 1 can adjust the rotational speed automatically according to the environmental temperature and the radiation intensity. In the manual mode, the user controls the rotational speed of the smart fan 1 manually. For example, the user can adjust the rotational speed of the smart fan 1 via a gear switch.

In at least one exemplary embodiment, the temperature sensor 120 can send the detected environmental temperature to the controller 11 and the infrared sensor 121 can send the collected radiation intensity to the controller 11. The controller 11 can generate analysis results according to the detected environmental temperature and the collected radiation intensity. In detail, the controller 11 can determine whether the detected environmental temperature is within the predetermined temperature range, and whether the collected radiation intensity is greater than a predetermined value, and generate the result of analysis. The controller 11 further can switch a working status of the smart fan 1 according to the results. The working status of the smart fan 1 includes increasing the rotational speed of the smart fan 1, decreasing the rotational speed of the smart fan 1, and turning off the smart fan 1.

In at least one exemplary embodiment, when the detected environmental temperature is within the predetermined temperature range, and the collected radiation intensity is equal to or less than the predetermined value, the controller 11 can increase the rotational speed of the smart fan 1. The distance from the infrared sensor 121 to the user is far when the collected radiation intensity is equal to or less than the predetermined value, so that the user is far from the smart fan 1. The speed controller 110 can increase the rotational speed of the smart fan 1 to make the user feel cool. When the detected environmental temperature is within the predetermined temperature range, and the collected radiation intensity is greater than the predetermined value, the controller 11 can decrease the rotational speed of the smart fan 1 by the speed controller 110. The distance from the infrared sensor 121 to the user is close when the collected radiation intensity is greater than the predetermined value, so that the user is close to the smart fan 1. The speed controller 110 can decrease the rotational speed of the smart fan 1 to protect the user from being overcooled. The user may feel comfortable when the environmental temperature is within the predetermined temperature range. For example, the predetermined temperature range may from 22° C. to 26° C.

In at least one exemplary embodiment, when the detected environmental temperature is higher than a maximum temperature of the predetermined temperature range, and the collected radiation intensity is greater than the predetermined value, the controller 11 can increase the rotational speed of the smart fan 1 by the speed controller 110. When the detected environmental temperature is lower than a minimum temperature of the predetermined temperature range, and the collected radiation intensity is greater than the predetermined value, the controller 11 can turn off the smart fan 1.

Figure 2:
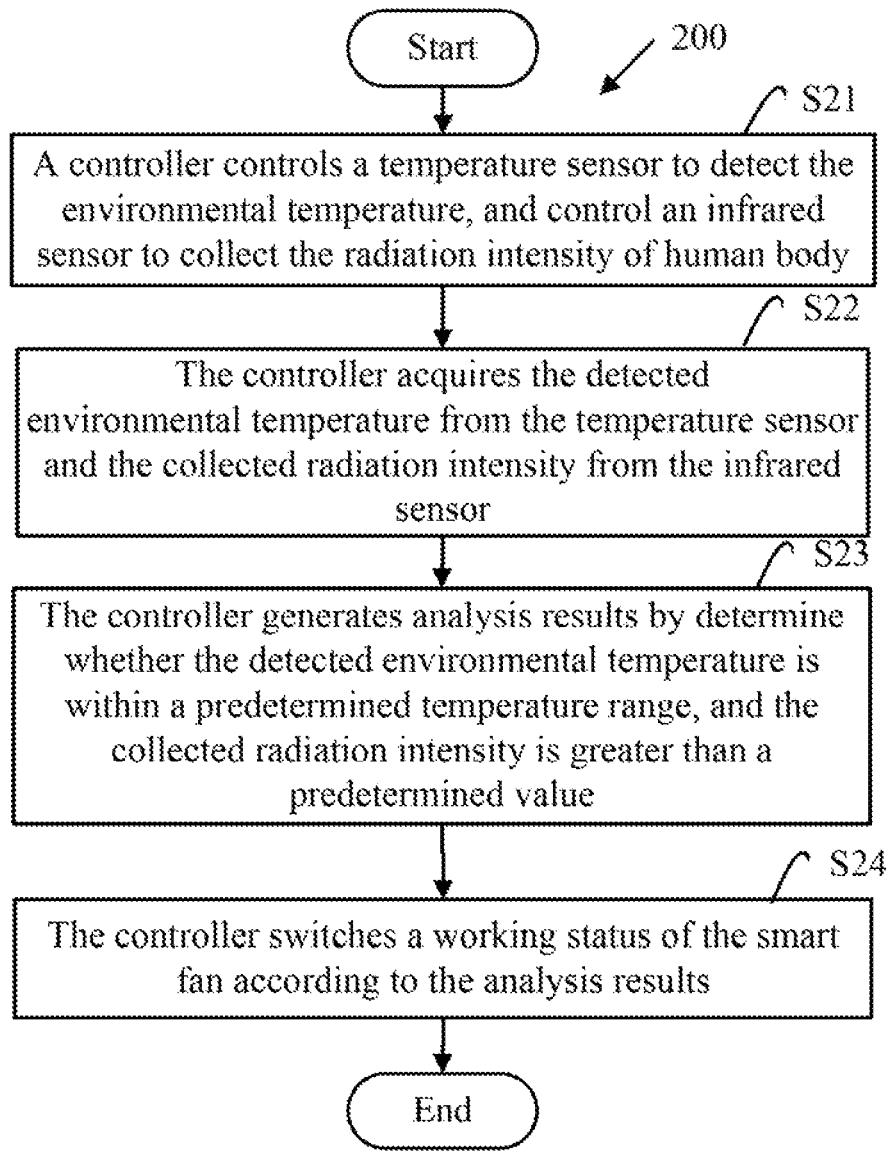
FIG. 2 illustrates a flow chart of one exemplary embodiment of a method for controlling rotational speed of the smart fan of FIG. 1.

FIG. 2 illustrates a flowchart which is presented in accordance with an example embodiment. The exemplary method 200 is provided by way of example, as there are a variety of ways to carry out the method. The method 200 described below can be carried out using the configurations illustrated in FIG. 1, for example, and various elements of these figures are referenced in explaining exemplary method 200. Each block shown in FIG. 2 represents one or more processes, methods, or subroutines, carried out in the exemplary method 200. Additionally, the illustrated order of blocks is by example only and the order of the blocks can be changed according to the present disclosure. The exemplary method 200 can begin at block S21. Depending on the embodiment, additional steps can be added, others removed, and the ordering of the steps can be changed.

At block S21, the controller 11 can control the temperature sensor 120 to detect the environmental temperature, and control the infrared sensor 121 to collect the radiation intensity of the human body when the smart fan 1 is in the sleep mode.

At block S22, the controller 11 can acquire the detected environmental temperature from the temperature sensor 120 and the collected radiation intensity from the infrared sensor 121.

At block S23, the controller 11 can generate analysis results by determining whether the detected environmental temperature is within the predetermined temperature range, and the collected radiation intensity is greater than the predetermined value.

At block S24, the controller 11 can switch a working status of the smart fan 1 according to the analysis results. The working status of the smart fan 1 includes increasing the rotational speed of the smart fan 1, decreasing the rotational speed of the smart fan 1, and turning off the smart fan 1.

In at least one exemplary embodiment, when the detected environmental temperature is within the predetermined temperature range, and the collected radiation intensity is equal to or less than the predetermined value, the controller 11 can increase the rotational speed of the smart fan 1. The distance from the infrared sensor 121 to the user is far when the collected radiation intensity is equal to or less than the predetermined value, so that the user is far from the smart fan 1. The speed controller 110 can increase the rotational speed of the smart fan 1 to make the user feel cool. When the detected environmental temperature is within the predetermined temperature range, and the collected radiation intensity is greater than the predetermined value, the controller 11 can decrease the rotational speed of the smart fan 1. The distance from the infrared sensor 121 to the user is close when the collected radiation intensity is greater than the predetermined value, so that the user is close to the smart fan 1. The speed controller 110 can decrease the rotational speed of the smart fan 1 to protect the user from being overcooled.

In at least one exemplary embodiment, when the detected environmental temperature is higher than a maximum temperature of the predetermined temperature range, and the collected radiation intensity is greater than the predetermined value, the controller 11 can increase the rotational speed of the smart fan 1. When the detected environmental temperature is lower than a minimum temperature of the predetermined temperature range, and the collected radiation intensity is greater than the predetermined value, the controller 11 can turn off the smart fan 1.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A smart fan comprising:
   a plurality of sensors comprising a temperature sensor and an infrared sensor, wherein the temperature sensor detects environmental temperature and the infrared sensor collects radiation intensity of human body; and
   a controller acquires the detected environmental temperature from the temperature sensor and the collected radiation intensity from the infrared sensor, wherein
   the controller increases rotational speed of the smart fan when the detected environmental temperature is within a predetermined temperature range, and the collected radiation intensity is equal to or less than a predetermined value;
   the controller decreases the rotational speed of the smart fan when the detected environmental temperature is within the predetermined temperature range and the collected radiation intensity is greater than the predetermined value; and the controller adjusts the rotational speed automatically according to the detected environmental temperature and the collected radiation intensity when the smart fan is in sleep mode.

2. The smart fan according to claim 1, wherein
the controller increases the rotational speed of the smart fan when the detected environmental temperature is higher than a maximum temperature of the predetermined temperature range; and
the controller turns off the smart fan when the detected environmental temperature is lower than a minimum temperature of the predetermined temperature range.

3. The smart fan according to claim 2, wherein the controller comprises a speed controller, which adjusts the rotational speed of the smart fan.

4. The smart fan according to claim 1, further comprising a battery, which supply electrical energy to the smart fan.

5. A rotational speed controlling method applied in a smart fan, the smart fan comprises a temperature sensor and an infrared sensor, the method comprising:
acquiring environmental temperature from the temperature sensor and radiation intensity of human body from the infrared sensor;
increasing rotational speed of the smart fan by a speed controller of the smart fan when the acquired environmental temperature is within a predetermined temperature range, and the acquired radiation intensity is equal to or less than a predetermined value;
decreasing the rotational speed of the smart fan by the speed controller when the acquired environmental temperature is within the predetermined temperature range and the acquired radiation intensity is greater than the predetermined value; and
the controller adjusts the rotational speed automatically according to the detected environmental temperature and the collected radiation intensity when the smart fan is in sleep mode.

6. The rotational speed controlling method according to claim 5, further comprising:
increasing the rotational speed of the smart fan by the speed controller when the acquired environmental temperature is higher than a maximum temperature of the predetermined temperature range; and
turning off the smart fan when the acquired environmental temperature is lower than a minimum temperature of the predetermined temperature range.

* * * * *